United States Patent [19]

Williamson et al.

[11] 4,035,233

[45] July 12, 1977

[54] CHANNEL FOLLOWER LEAKAGE RESTRICTOR

[75] Inventors: Harold Eugene Williamson; Bart Alan Smith, both of San Jose, Calif.

[73] Assignee: General Electric Company, San Jose, Calif.

[21] Appl. No.: 587,842

[22] Filed: June 18, 1975

[51] Int. Cl.² .......................................... G21C 3/30
[52] U.S. Cl. .................................... 176/78; 176/43; 176/76
[58] Field of Search .......................... 176/43, 76, 78

[56] References Cited

U.S. PATENT DOCUMENTS

| 3,172,819 | 3/1965 | Picton | 176/43 X |
| 3,338,791 | 8/1967 | Lass et al. | 176/76 X |
| 3,349,004 | 10/1967 | Lass et al. | 176/87 X |
| 3,689,358 | 9/1972 | Smith et al. | 176/76 X |
| 3,697,376 | 10/1972 | Mefford et al. | 176/76 X |
| 3,715,274 | 2/1973 | Venier et al. | 176/76 X |

*Primary Examiner*—Peter A. Nelson
*Attorney, Agent, or Firm*—Ivor J. James, Jr.; Samuel E. Turner; Sam E. Laub

[57] ABSTRACT

An improved means is provided to control coolant leakage between the flow channel and the lower tie plate of a nuclear fuel assembly. The means includes an opening in the lower tie plate and a movable element adjacent thereto. The coolant pressure within the tie plate biases the movable means toward the inner surface of the surrounding flow channel to compensate for any movement of the flow channel away from the lower tie plate to thereby control the leakage of coolant flow from the fuel assemblies to the spaces among the fuel assemblies of the core.

12 Claims, 9 Drawing Figures

CHANNEL FOLLOWER LEAKAGE RESTRICTOR

BACKGROUND OF THE INVENTION

In a know type of nuclear reactor, for example as used in the Dresden Nuclear Power Station near Chicago, Ill., the reactor core comprises a plurality of fuel assemblies arranged in an array capable of self-sustained nuclear fission reaction. The core is contained in a pressure vessel wherein it is submerged in a working fluid, such as light water, which serves both as coolant and as a neutron moderator. A plurality of control rods, containing neutron absorbing material, are selectively insertable among the fuel assemblies to control the reactivity of the core. For further information on nuclear reactors see, for example, "Nuclear Power Engineering", M. M. El-Wakil, McGraw-Hill Book Company, Inc., 1962.

Each fuel assembly comprises a tubular flow channel, typically of approximately square cross section, containing an array of elongated, cladded fuel elements or rods supported between upper and lower tie plates. The fuel assemblies are supported in the pressure vessel between an upper core grid and a lower core support plate. The lower tie plate of each fuel assembly is formed with a nose piece which fits through an aperture in the core support plate into a pressurized coolant supply chamber. The nose piece is formed with openings through which the pressurized coolant flows upward through the fuel assembly flow channels to remove heat from the fuel elements. A typical fuel assembly of this type is shown, for example, by D. A. Venier et al. in U.S. Pat. No. 3,350,275. In nuclear reactors of recent design, in-core nuclear instrumentation, in the form of neutron detector, is contained in instrumentation receptacles located in the spaces or gaps between the fuel assemblies.

In a boiling water reactor, heat is transferred from the fuel through the fuel rod cladding to the water flowing upward among the fuel rods. At some elevation the flowing water reaches saturation temperature and beyond this point increasing fractions of the water are in the vapor phase. Normally the heat transfer coefficient between the fuel rod cladding and the water is substantially constant. However, if the heat-flux and consequently the steam fraction is increased sufficiently, a threshold is reached at which the heat transfer coefficient decreases suddenly by a factor of 5 to 10. This is caused by a change in the heat transfer mechanism from nucleate boiling to film boiling and it results in a very rapid, undesirable rise in fuel rod cladding temperature. The heat flux at the threshold between nucleate boiling and film boiling is designated the "critical heat flux."

An important consideration in the design of boiling water reactors is the relationship between the in-channel flow (or the coolant flow through the fuel assembly flow channels) and the bypass flow (or the coolant flow through the gaps among the fuel assemblies). On the one hand it is desirable to maximize the in-channel flow to thereby maximize the margin to critical heat flux. On the other hand it is necessary to provide a limited amount of bypass flow to avoid coolant stagnation and steam voids and to adequately cool the control rods and the in-core instrumentation devices located in the gaps between the fuel assembly flow channels. Thus for a given total core recirculation flow, the desired balance between in-channel and bypass flow maintains an adequate margin to critical heat flux while avoiding excessive out-of-channel voids.

In prior arrangments control of bypass flow is accomplished by allowing an amount of coolant leakage between the assembly flow channel and the lower tie plate. The flow channel is not fixed to the fuel assembly but is instead a slip fit over the upper and lower tie plates so that it readily can be removed during refueling and for inspection of the fuel rods and fuel assemblies. The flow channel is formed of relatively thin material to conserve space and to minimize parasitic neutron absorption and it is found that increases in pressure of the coolant (to increase coolant flow through the fuel assemblies) causes the flow channel to deflect and move away from the lower tie plate thus causing an excessive amount of bypass or leakage flow with the danger of depriving the fuel assembly of its required coolant flow.

Several arrangements have been proposed in the past to control excessive leakage flow created by such movement of the flow channel. Such arrangements are disclosed and claimed by B. A. Smith et al. in U.S. Pat. No. 3,689,358, C. R. Mefford et al. in U.S. Pat. No. 3,697,376 and by D. A. Venier et al. in U.S. Pat. No. 3,715,274. In these arrangements, see for example FIG. 2 of U.S. Pat. No. 3,689,358, the leakage flow is from the lower portion of the fuel assembly, downward between the lower tie plate and surrounding flow channel and out beneath the lower edge of the flow channel. Thus the leakage flow, together with the general coolant flow, has suffered the pressure drop across the fuel element support grid of the lower tie plate.

The object of the present invention is to provide an improved leakage flow control arrangement wherein the pressure difference between the coolant within the lower tie plate (below the fuel element support grid) and the bypass coolant outside the nose piece is utilized to maintain leakage flow control members in engagement with the surrounding flow channel.

SUMMARY OF THE INVENTION

Briefly stated, in accordance with one aspect of the present invention, an improved leakage flow control means is provided which comprises an opening in the lower tie plate and movable means supported between the opening and the adjacent flow channel, whereby the coolant pressure within the lower tie plate biases the movable means into engagement with the flow channel to limit the leakage of coolant between the lower tie plate and the flow channel.

BRIEF DESCRIPTION OF THE DRAWINGS

While the specification concludes with claims particularly pointing out and distinctly claiming the subject matter which is regarded as the invention, it is believed the invention will be better understood from the following description of the preferred embodiment taken in connection with the accompanying drawings, in which:

DESCRIPTION OF THE PREFERRED EMBODIMENT

Figure 1:
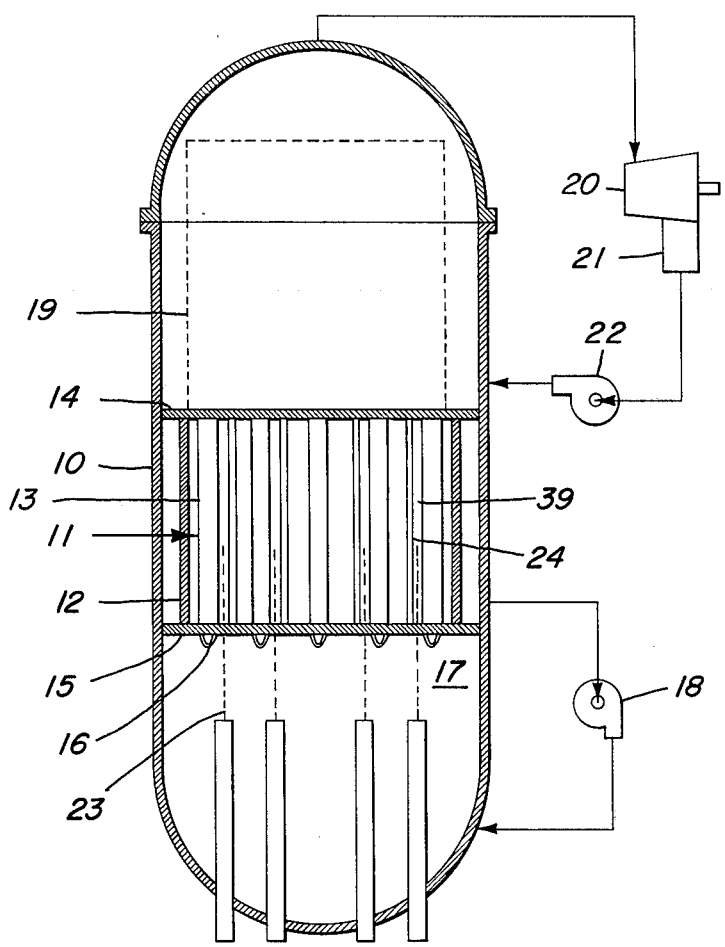
FIG. 1 is a schematic representation of water reactor steam generator system.

Referring now to the drawings, and initially to FIG. 1 thereof, there is illustrated a reactor system which includes a pressure vessel 10 containing a nuclear chain reactor core 11 submerged in a coolant such as light water. The core 11 is surrounded by an annular shroud 12. The core 11 includes a plurality of replaceable fuel assemblies 13 arranged in spaced relation and supported in the vessel 10 between an upper core grid 14 and a lower core support plate 15. Each fuel assembly includes a nose piece 16 which engages a support socket in the support plate 15. The end of the nose piece projects through the support plate 15 and is formed with openings for communication with a coolant supply chamber 17. A circulation pump 18 pressurizes the coolant in supply chamber 17 from which the coolant is forced through the openings in nose pieces 16 upward through the fuel assemblies. A part of the coolant is thereby converted to steam which passes through a separator-dryer arrangement 19 to utilization device such as a turbine 20. Condensate formed in a condenser 21 is returned as feedwater to the vessel 10 by a pump 22. A plurality of control rods 23 are selectively insertable among fuel assemblies 13 for control of the reactivity of the core. A plurality of instrumentation receptacles 24 are positioned among fuel assemblies 13 to contain neutron detectors for monitoring the power level of the core.

Figure 2:
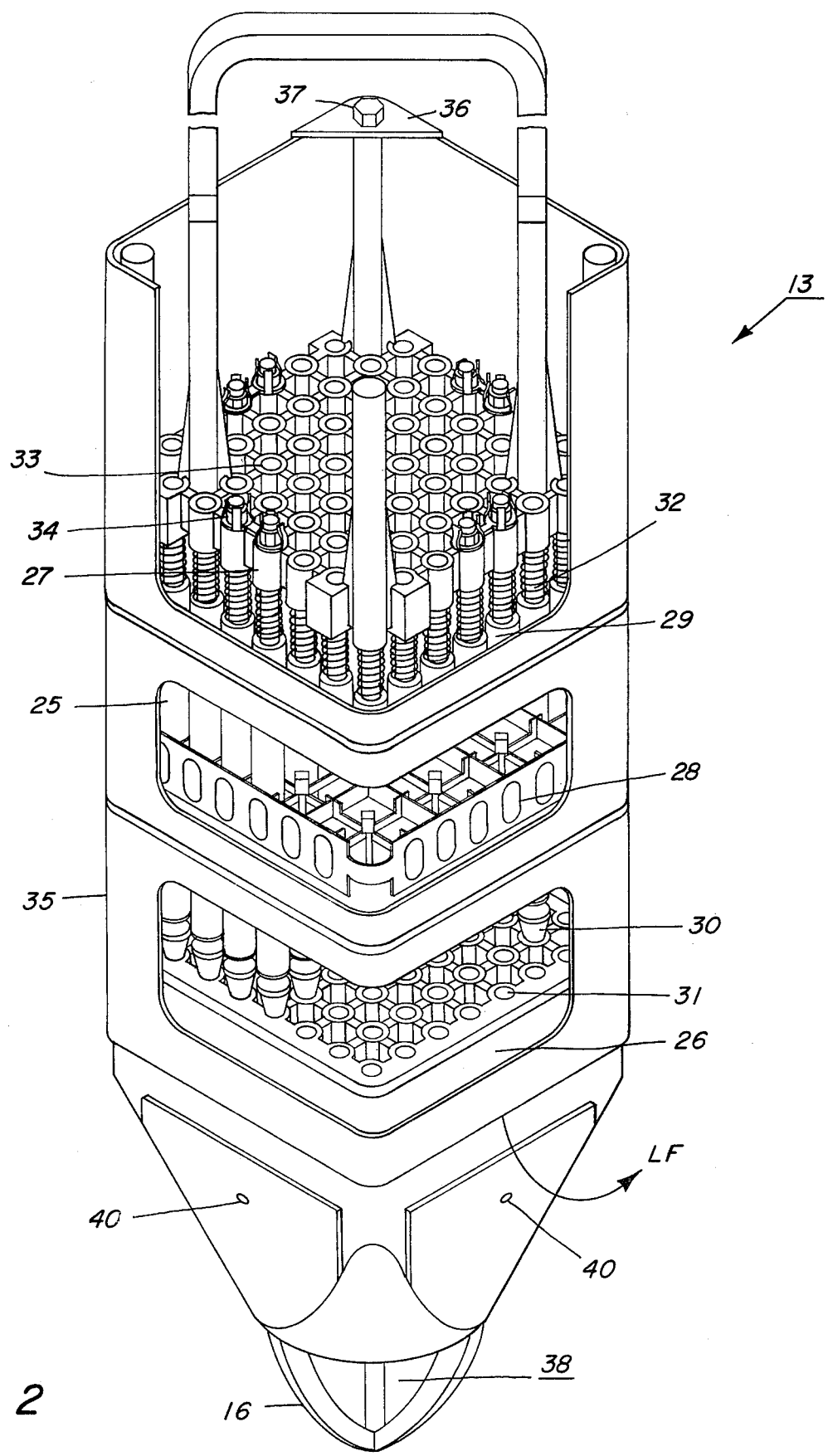
FIG. 2 is a perspective view, partially cut away to show details of a fuel assembly.
Figure 3:
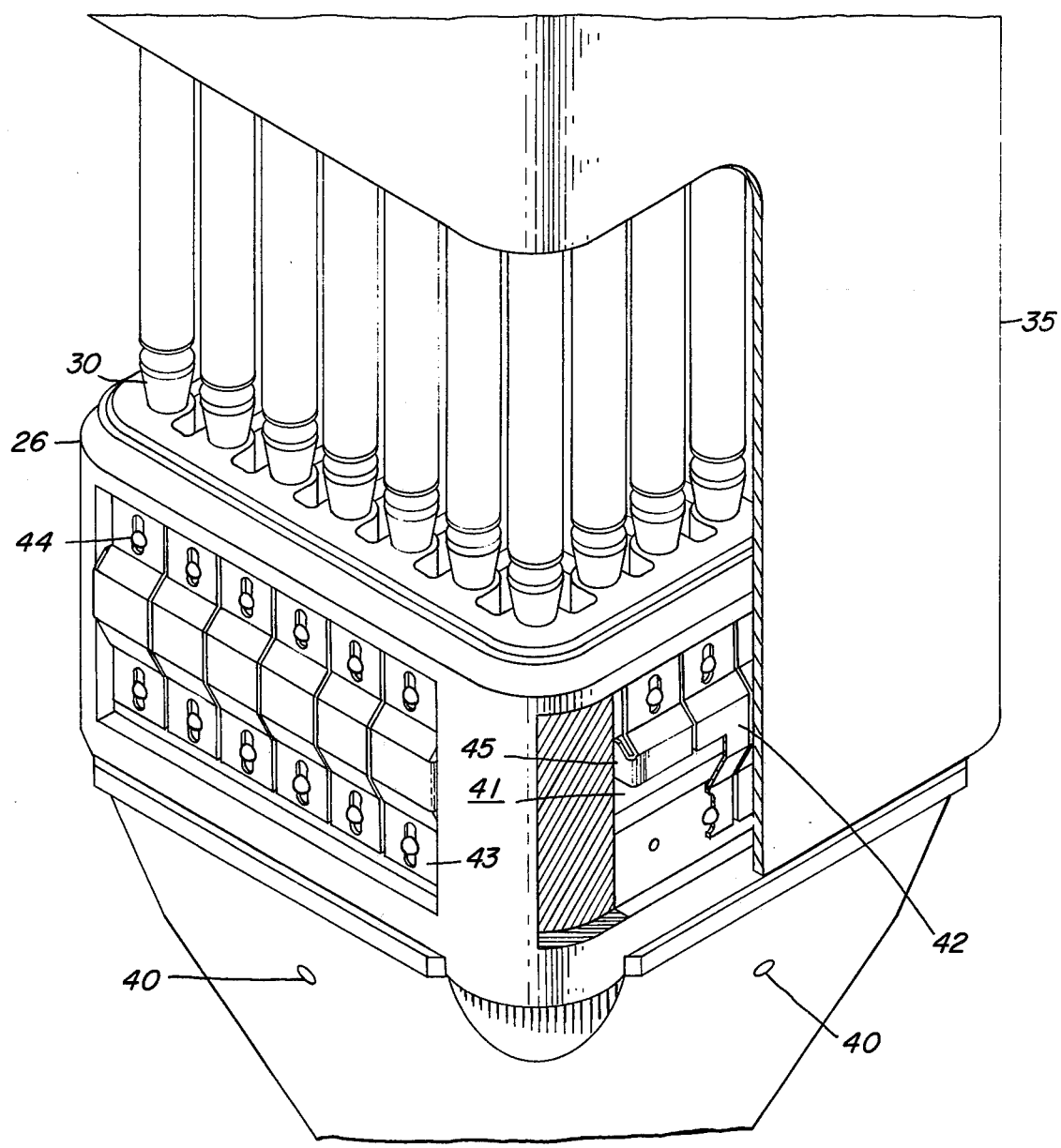
FIG. 3 is an enlarged view (partially cut away) of the lower portion of the fuel assembly of FIG. 2 illustrating a first embodiment of the leakage control means.

Illustrated in FIG. 2 is a fuel assembly 13 comprising a plurality of elongated fuel rods 25 supported between a lower tie plate 26 and an upper tie plate 27. Fuel rods 25 pass through a plurality of fuel rod spacers 28 which provide intermediate support to retain the elongated rods in spaced relation and restrain them from lateral vibration.

Each fuel rods 25 comprises an elongated tube containing the fissile fuel (such as uranium or plutonium dioxide) in the form of pellets, particles, powder or the like, sealed in the tube by upper and lower end plugs 29 and 30. Lower end plugs 30 are formed with a taper for registration and support in support cavities 31 which are formed in lower tie plate 26. Upper end plugs 29 are formed with extensions 32 which register with support cavities 33 in upper tie plate 27.

Several of the support cavities 31 (for example, selected ones of the edge or peripheral cavities) in lower tie plate 26 are formed with threads to receive fuel rods having threaded lower end plugs 30. Extensions 32 of upper end plugs 29 of these same fuel rods are elongated to pass through the cavities in upper tie plate 27 and are formed with threads to receive internally threaded retaining nuts 34. In this manner the upper and lower tie plates and the fuel rods are formed into a unitary structure.

Fuel assembly 13 further inclues a thin-walled tubular flow channel 35, of substantially square cross section, adapted to provide a sliding fit over lower and upper tie plates 26 and 27 and spacers 28 so that it readily may be mounted and removed. Channel 35 has a tab 36 welded to its top end which provides for fastening the channel to the fuel bundle with a bolt 37.

Figure 4:
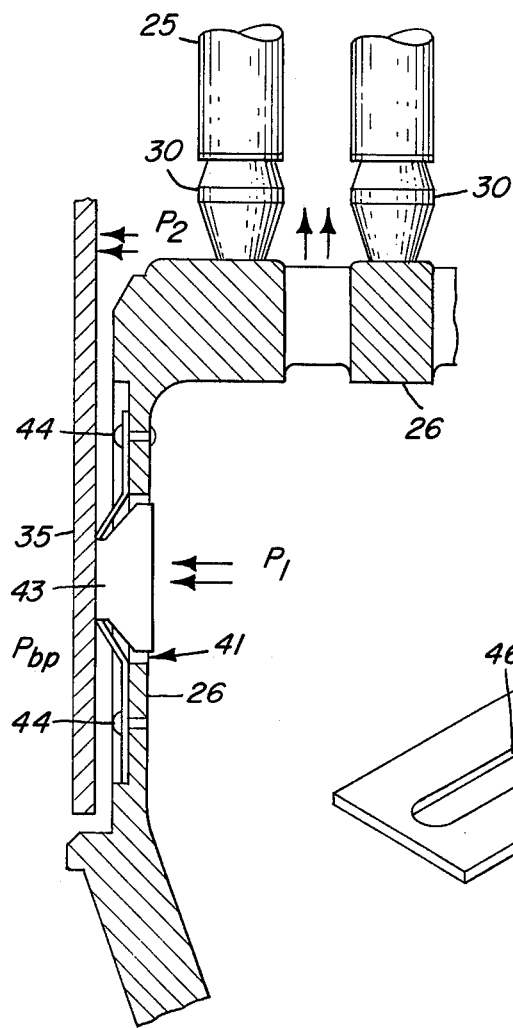
FIG. 4 is a fragmentary sectional view of the leakage control means of FIG. 3.

Lower tie plate 26 is formed with nose piece 16 adapted, as mentioned above, to support the fuel assembly in a socket in the support plate 15 (FIG. 1). The end of the nose piece is formed with openings 38 to receive the pressurized coolant at a pressure $P_1$ so that it flows upward among the fuel rods at a pressure $P_2$ after passing through the fuel element support grid 26 of the lower tie plate. (See FIG. 4).

To avoid stagnation of the coolant in the spaces 39 (FIG. 1) among the fuel assemblies, a portion (in the order of 5–10 percent) of the coolant flow into each fuel assembly is allowed to leak into spaces 39 from between lower tie plate 26 and channel 35 of the fuel assembly as indicated by the arrow LF in FIG. 2 and through special bypass flow passages 40 in lower tie plate 26 if desired. As discussed above, some prior arrangements have not provided ideal regulation of this leakage flow.

In accordance with the present invention, an improved leakage flow control means is provided to control the amount of leakage flow between flow channel 35 and lower tie plate 26. A first embodiment of the invention is illustrated by FIG. 3, 4, 5 and 6. Referring thereto, it can be seen that an opening 41 in lower tie plate 26 is provided in the area where flow channel 35 overlaps tie plate 26. Disposed between opening 41 and the inner surface of flow channel 35 are a plurality of movable means, elements or members 42 and 43. Each of members 42 and 43 is secured to lower tie plate 26 by means of rivets 44 or other suitable means. Sufficient resiliency exists in members 42 and 43 to allow them to move outward into engagement with the inner surface of the flow channel 35 in response to the relatively high pressure $P_1$ within tie plate 26 (as compared to the bypass coolant pressure $P_{bp}$ outside the flow channel 35). Thus, as flow channel 35 moves, members 42 and 43 follow this movement to maintain a relatively constant restriction of leakage flow.

Figure 5:
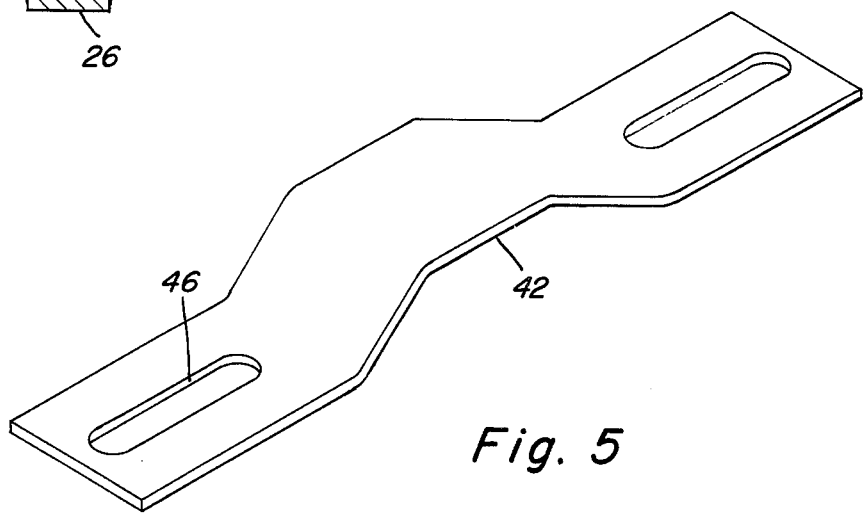
FIGS. 5 and 6 are perspective views of the individual movable elements of the leakage control means of FIG. 3.
Figure 6:
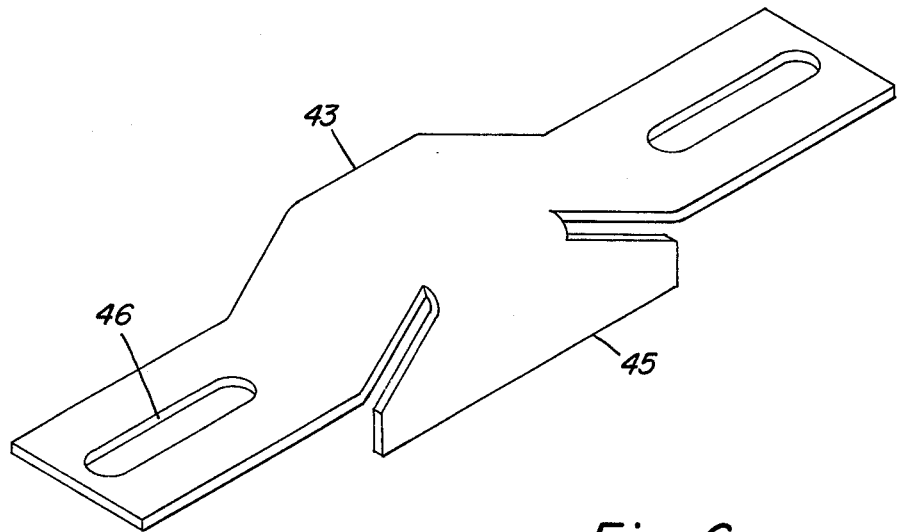

FIGS. 5 and 6 show members 42 and 43 in greater detail. It can be seen that members 43 is identical to member 42 except that it is provided with a side flange 45 which serves to prevent coolant escaping adjacent the corners of lower tie plate 26. The rivets 44 pass through slots 46 which enhances flexure movement of members 42 and 43 during operation of the leakage flow control means.

Figure 7:
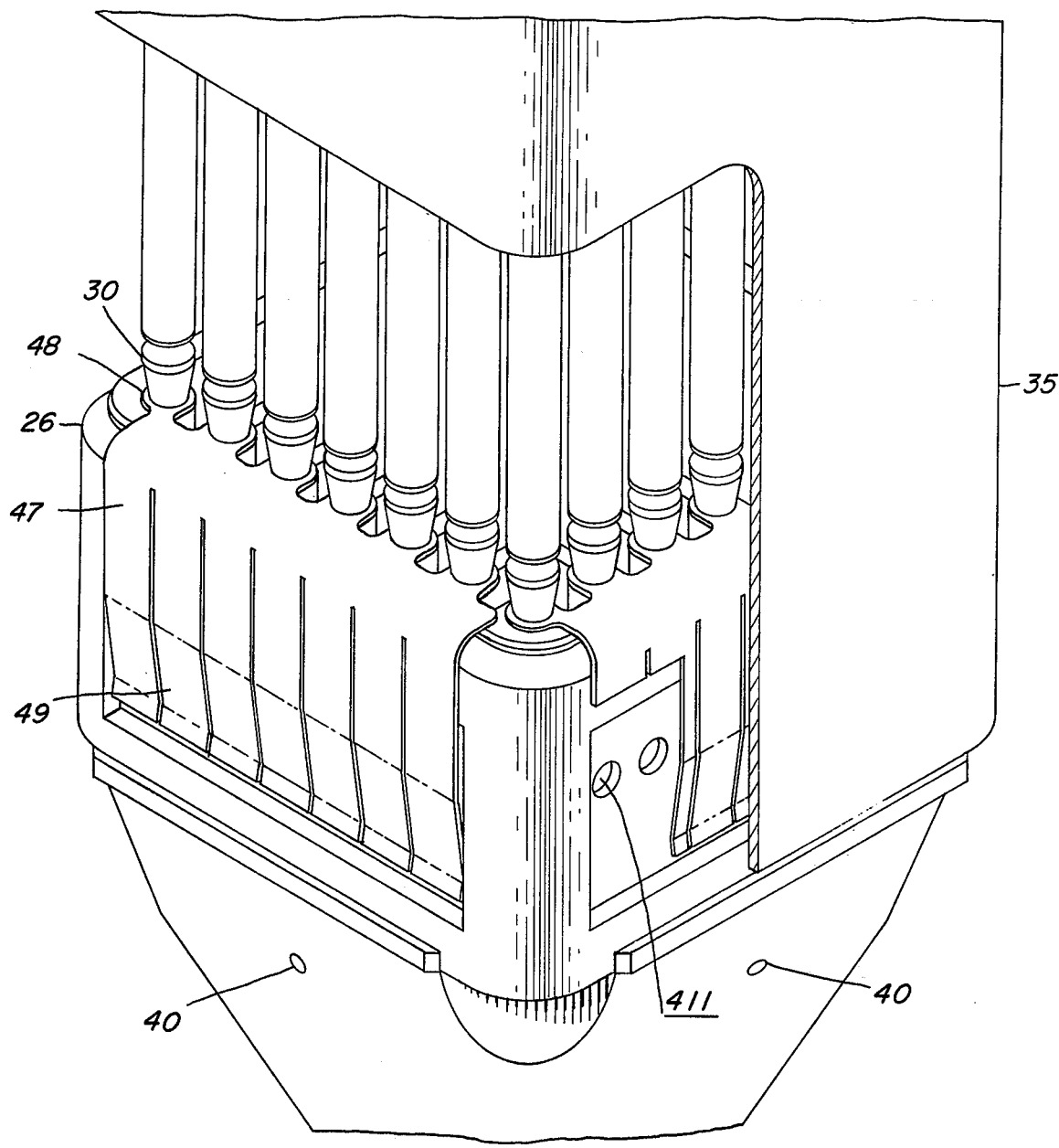
FIG. 7 is an enlarged view of the lower portion of the fuel assembly illustrating a second embodiment of the leakage control means.
Figure 8:
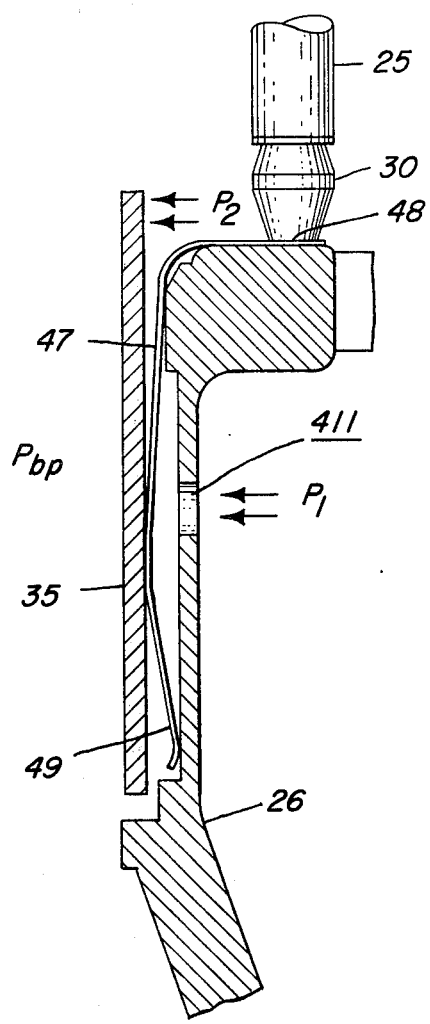
FIG. 8 is a fragmentary sectional view of the second embodiment of the present invention.
Figure 9:
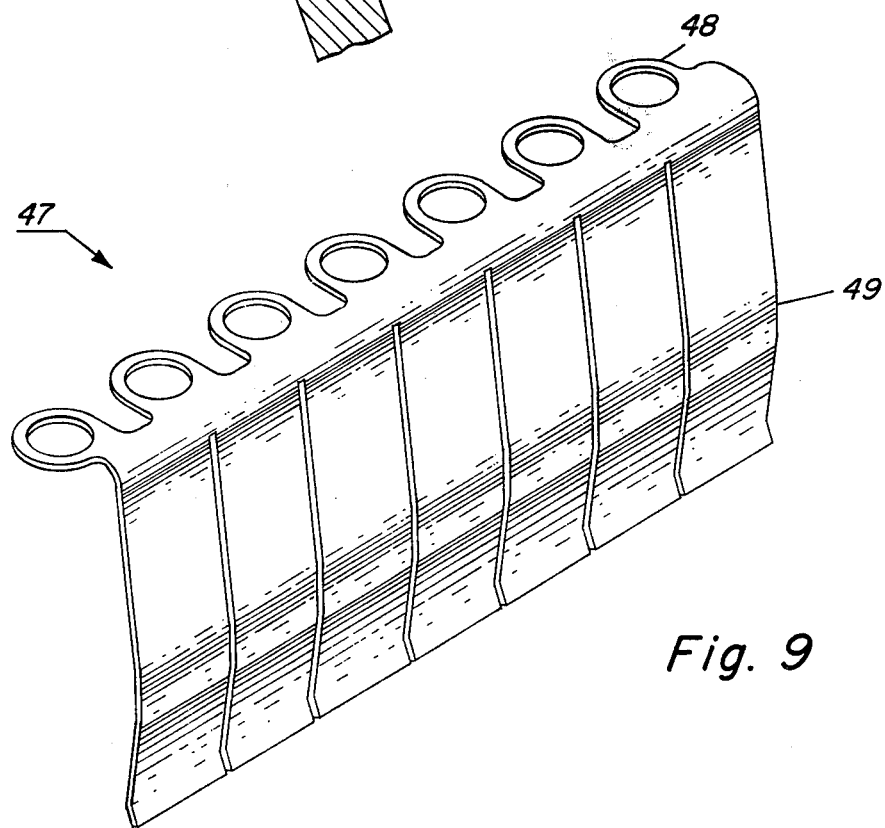
FIG. 9 is a perspective view of a finger spring member of the second embodiment.

A second embodiment of the present invention is illustrated in FIGS. 7, 8 and 9. In this embodiment, opening 41 may be somewhat smaller than the opening in the embodiment described above (or it may be constituted by a plurality of holes 411) and the movable member is in the form of a finger spring member 47 (FIG. 9) which has an upper portion 48 with openings therein through which lower end plugs 30 pass. Finger spring 47 is thus secured to lower tie plate 26 by capture of the upper portion 48 between end plugs 30 and tie plate 26 as shown in FIG. 7. In this embodiment, also, the pressure $P_1$ within tie plate 26 biases fingers 49 of member 47 into engagement with channel 35 so that fingers 49 follow channel 35 as it moves radially during operation of the nuclear reactor to thereby provide a relatively constant leakage flow control throughout the operational cycle of the fuel assembly.

As will be evident from the foregoing description, certain aspects of the invention are not limited to the particular details of construction of the examples illustrated, and it is contemplated that various other modifications or applications will occur to those skilled in the art. It is therefore intended that the appended claims shall cover such modifications and applications as do not depart from the true spirit and scope of the invention.

What we claim as new and desire to secure by Letters Patent of the United States is:

1. In a fuel assembly comprising a plurality of fuel rods positioned in a spaced array by engagement with upper and lower tie plates, said lower tie plate having means to receive therethrough a flow of pressurized coolant, an open-ended tubular flow channel surrounding said array and said tie plates for conducting said coolant upwardly past said fuel rods, and a leakage control means positioned between said lower tie plate and said flow channel to limit the leakage of said coolant between said lower tie plate and said flow channel, the improvement wherein said leakage control means comprisies an opening in said lower tie plate and movable leakage control members positioned in the path of coolant flow through said opening from inside said lower tie plate and between said opening and said flow channel whereby the coolant pressure within said lower tie plate biases said control members toward said flow channel to limit the leakage of coolant between said lower tie plate and said flow channel.

2. The invention of claim 1 wherein said leakage control members are supported by said lower tie plate and substantially cover said opening.

3. The invention of claim 2 wherein said members are secured to said lower tie plate by rivets.

4. The invention of claim 2 wherein said members comprise finger springs.

5. The invention of claim 4 wherein said opening comprises a series of holes.

6. The invention of claim 4 wherein said finger springs have an upper portion formed with holes and said finger springs are held in place by capture between lower ends of said fuel rods and said lower tie plate.

7. In a fuel assembly for a nuclear reactor core comprising a plurality of fuel rods positioned in a spaced array by engagement with upper and lower tie plates, said lower tie plate having means to receive therethrough a flow of pressurized coolant, a removable open-ended tubular flow channel adapted to surround said array and said tie plates for conducting said coolant upwardly past said fuel rods when said fuel assembly is installed in said core surrounded by said flow channel, and a leakage control means positioned adjacent said lower tie plate for limiting leakage of said coolant between said lower tie plate and said flow channel during operation in said nuclear reactor, the improvement wherein said leakage control means comprises an opening in said lower tie plate and movable leakage control members positioned adjacent said opening in the path of coolant flow through said opening from inside said lower tie plate whereby coolant pressure within said lower tie plate biases said control members outward, whereby said control members are forced into contact with said flow channel to limit the leakage of coolant between said lower tie plate and said flow channel during operation in said nuclear reactor 8. The invention of claim 7 wherein said movable leakage control members comprise a plurality of members supported by said lower tie plate and substantially covering said opening.

9. The invention of claim 8 wherein said members are secured to said lower tie plate by rivets.

10. The invention of claim 8 wherein said members comprise finger springs.

11. The invention of claim 10 wherein said opening comprises a series of holes.

12. The invention of claim 10 wherein said finger springs have an upper portion formed with holes and said finger springs are held in place by capture between lower ends of said fuel rods and said lower tie plate.

* * * * *